(12) United States Patent
Williams et al.

(10) Patent No.: US 8,656,989 B1
(45) Date of Patent: Feb. 25, 2014

(54) GRID-STIFFENED PANEL WITH INTEGRATED FLUID DISTRIBUTION CHANNELS

(75) Inventors: Andrew D. Williams, Edgewood, NM (US); Brandon J. Arritt, Sandia Park, NM (US); M. Eric Lyall, Albuquerque, NM (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 1607 days.

(21) Appl. No.: 12/049,474

(22) Filed: Mar. 17, 2008

(51) Int. Cl.
*F28F 27/00* (2006.01)

(52) U.S. Cl.
USPC .......................................... 165/276; 165/11.1

(58) Field of Classification Search
USPC ................................................ 165/11.1, 276
See application file for complete search history.

(56) References Cited

U.S. PATENT DOCUMENTS

| 4,086,378 | A * | 4/1978 | Kam et al. | 428/34.5 |
| 6,283,412 | B1 * | 9/2001 | Mango | 244/135 R |
| 6,286,289 | B1 * | 9/2001 | Powell et al. | 52/790.1 |
| 7,093,470 | B2 * | 8/2006 | El-Soudani | 72/56 |
| 7,220,365 | B2 * | 5/2007 | Qu et al. | 165/104.15 |
| 2003/0066638 | A1 * | 4/2003 | Qu et al. | 165/186 |

OTHER PUBLICATIONS

Williams, A.D., et al., "Biologically Inspired Multifunctional Composite Panel with Integrated Circulatory System for Thermal Control", [online], Retrieved from the Internet: <URL: http://www.iccm-central.org/Proceedings/ICCM17proceedings/Themes/Applications/THERMAL%20APPLI%20&%20HEAT%20TRANSF/B9.5%20Williams.pdf>.*

Yang, Bozhi, et al., "A latchable microvalve using phase change of paraffin wax", Sep. 1, 2006, [online], [retrieved on Nov. 30, 2012]. Retrieved from the Internet: <URL: http://www.sciencedirect.com>.*

Andrew D. Williams, et al. "Symbiotic structures to significantly enhance space missions," Proc. of SPIE vol. 6525, Mar. 20, 2007.

Williams, A. D., "Robust Satellite Thermal Control Using Force Air Convection Thermal Switches for Operationally Responsive Space Missions," Master's Thesis, University of Colorado, Department of Aerospace Engineering Sciences, Boulder, Colorado (2005).

Williams, A. D., and Palo, S. E., "Issues and Implications of the Thermal Control System on Responsive Space Missions," 20th Annual American Institute of Aeronautics and Astronautics /USU Conference on Small Satellites, Logan, Utah (Aug. 2006).

Williams, A. D., et al, "Biologically Inspired Thermal-Structural Satellite Panels," American Institute of Aeronautics and Astronautics (presented Mar. 20, 2007).

Dussinger, P. M., et al, "Loop Heat Pipe for TacSat-4," Advanced Cooling Technologies, Inc., Lancaster, Pennsylvania (2004).

Maydanik, Y.F., "Loop heat pipes," Applied Thermal Technology, vol. 25, pp. 635-657 (Sep. 25, 2004).

"Loop Heat Pipe for High Density Small Satellite Thermal Control," Thermacore, Inc., Lancaster, Pennsylvania (1995).

Swanson, T. D., and Birur, G. C., "NASA thermal control technologies for robotic spacecraft," Applied Thermal Engineering, vol. 23, pp. 1055-1065 (Jan. 30, 2003).

* cited by examiner

*Primary Examiner* — Ljiljana Ciric
(74) *Attorney, Agent, or Firm* — James M. Skorich; Kenneth E. Callahan (57) ABSTRACT

A modified isogrid panel including face sheets and underlying longitudinal and transverse ribs which stiffen the panel. The ribs are hollow to provide fluid channels for distributing fluid to various sections of each face sheet. A valve at each node where ribs intersect controls or reroutes fluid flow through the fluid channels in the ribs. The ribs are the primary fluid distributors and are fluidly connected to capillary channels located beneath the surface of each face sheet.

4 Claims, 7 Drawing Sheets

Examples of Face-Sheet Fluid Channel Geometries

GRID-STIFFENED PANEL WITH INTEGRATED FLUID DISTRIBUTION CHANNELS

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

This invention relates generally to isogrid structures, and in particular to an improved design that incorporates a thermal control system within the structural components.

The traditional thermal control system for satellites is a strap-on type system that adds parasitic mass and reduces the usable volume of the satellite. A variety of systems are available including heat pipes, loop heat pipes, capillary pumped loops, and pumped loop systems. The advantage of fluid-based heat transfer systems is the high heat transfer rates that can be achieved. The disadvantage is that they are heavy. There is a need for a thermal control system that incorporates the advantages afforded by fluid convection without the inherent disadvantages. The present invention fulfills this need.

SUMMARY OF THE INVENTION

The present invention is a grid-stiffened structural panel that integrates channels in the panel to provide a fluid distribution system. The modified isogrid panel consists of face-sheets and a grid structure of longitudinal and transverse ribs to stiffen the panel. Either a single or double face-sheet construction can be used. Any grid structure is feasible. Fluid channels are integrated into the ribs by thickening the ribs and hollowing out the internal structure to form an annulus. The rib structure provides the primary fluid supply system. The fluid is then distributed to various sections of the face-sheet through a channel network integrated into the face-sheet. The channel network can be any configuration. The flow from the main supply system to the distribution system can be unregulated or controlled by passive or active valves. Finally, the system can be made damage tolerant or reconfigurable by incorporating a flow valve at each node where the ribs intersect. The flow through these nodes can be controlled or re-routed to provide additional fluid flow to specific parts of the panel or to avoid an area that is clogged, leaking, or damaged. A subsystem that produces excess heat may thereby be thermally controlled by positioning the subsystem on or near this modified isogrid plate.

BRIEF DESCRIPTION OF THE DRAWINGS

FIG. 3 shows a conventional isogrid structure (a), a modified isogrid structure incorporating fluid channels in the lengthwise ribs (b), and a modified isogrid structure showing a distribution system in the face-sheet (c).

DESCRIPTION OF THE PREFERRED EMBODIMENT

The driving design factor for aerospace structures is the stiffness-to-weight ratio of the system. For this reason, isogrid architectures are widely used in aerospace applications. They provide high stiffness and torsional rigidity while minimizing mass. By taking advantage of isogrid architectures, fluidic channels and electrical pathways can be integrated into ribs with minimal impact to the overall structural efficiency and mass of the system. Additionally, smaller fluid channels with integrated passive thermally-actuated valves can be incorporated in the face-sheet to significantly enhance the heat transport and to autonomously control the temperature of the system. Initially, the channels in the face-sheet were designed around standard multi-pass, single phase heat exchangers, but more advanced systems are also feasible.

Figure 1:
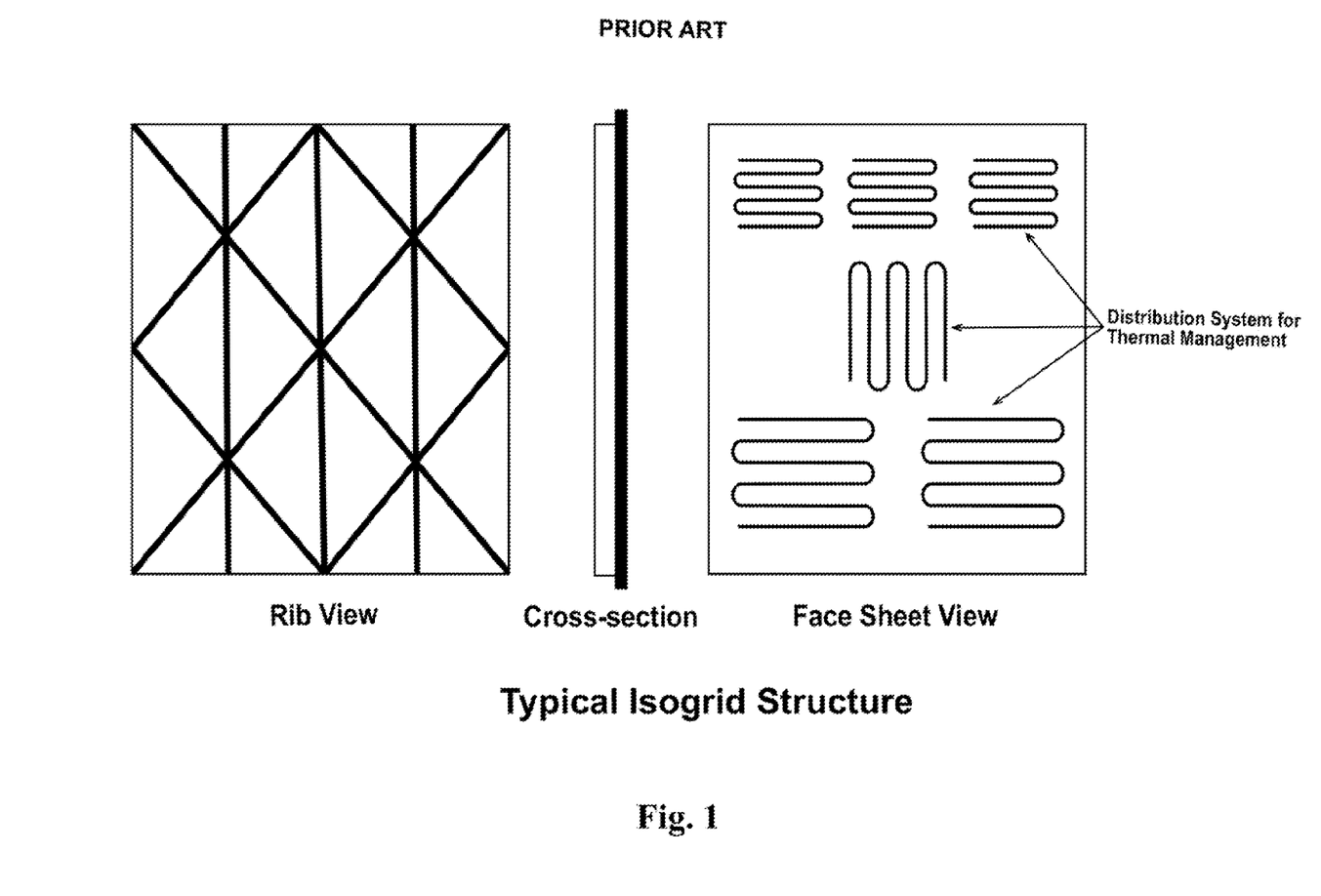
FIG. 1 is a sample diagram of an isogrid panel showing a typical rib pattern, a cross-sectional view, and a face sheet with a distribution system.
Figure 2A:
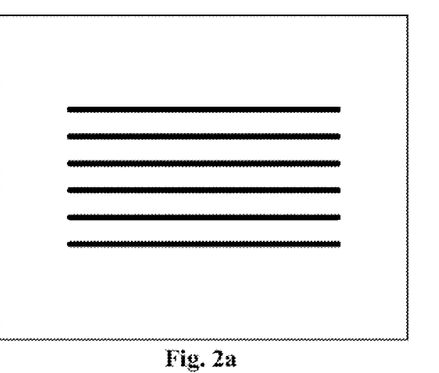
FIG. 2 shows examples of face sheet fluid channel geometries.
Figure 2B:
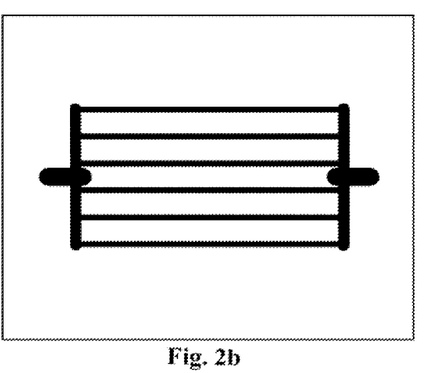
Figure 2C:
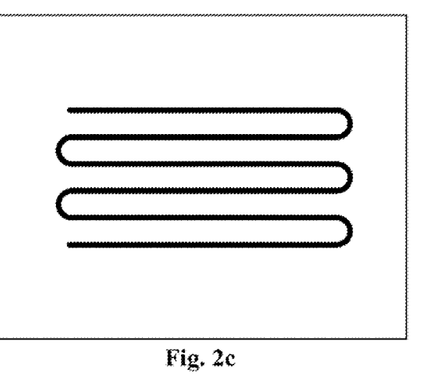
Figure 2D:
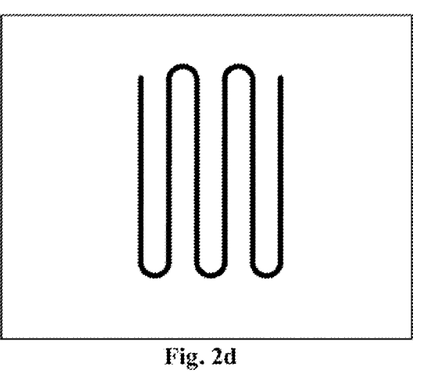

The inspiration for this concept was circulatory systems in biological systems, which consist of three primary structures. The first is the main artery system, which transports large volumes of fluid to the organs. The second is the capillary system, which distributes and controls the flow within the organ. The final is the heart, which is essentially a sophisticated pump. The distinctive properties of isogrid structures enable a system such as this where the ribs provide the necessary cross-sectional area to transport large fluid volume and the face-sheets provide the surface area for the distribution system. The concept is depicted in FIG. 1 which shows a typical isogrid rib structure attached to a face sheet (rib view), a cross-section view, and a face sheet view with an example of distribution channels embedded in the face sheet. Additional examples of face sheet capillary channel geometries are shown in FIG. 2.

Figure 3A:
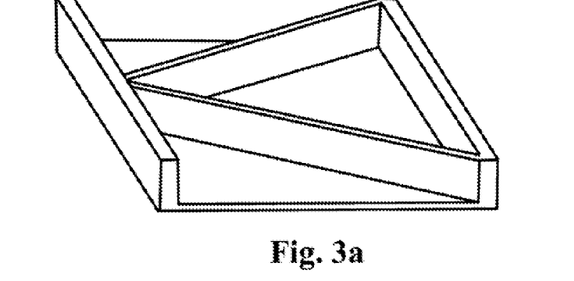
Figure 3B:
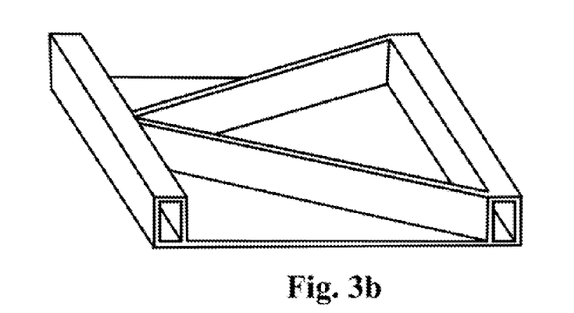
Figure 3C:
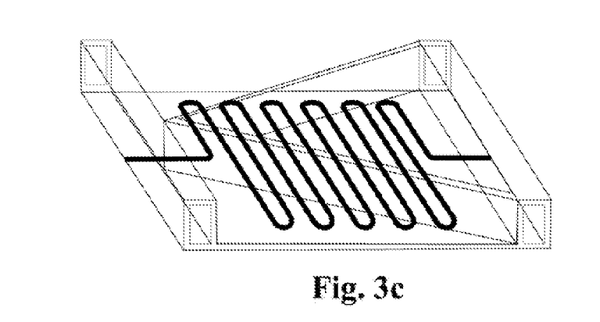
Figure 4:
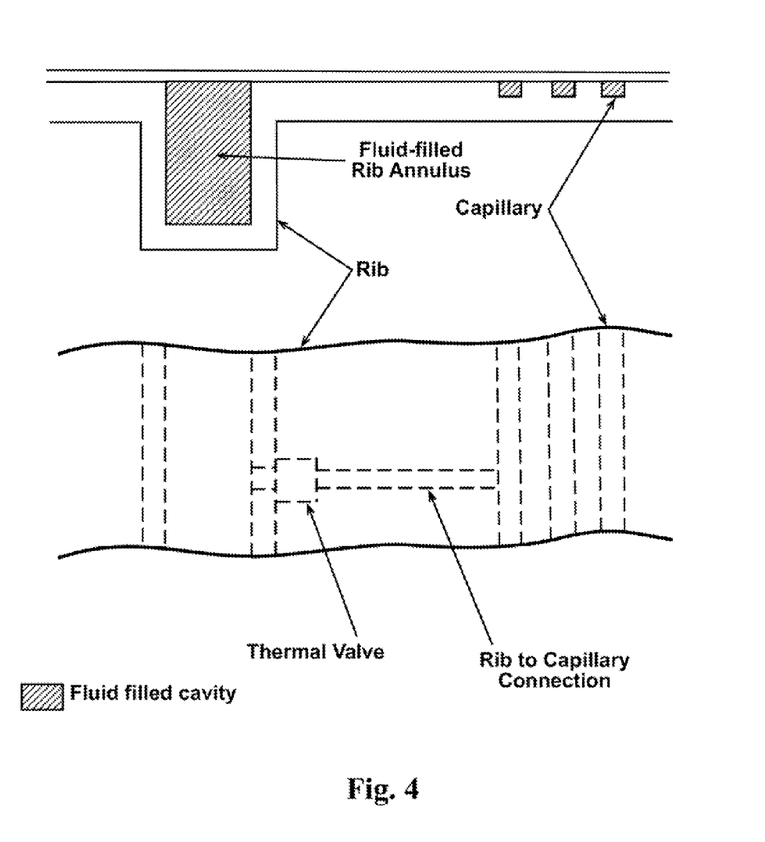
FIG. 4 is a cross-sectional and an overhead view of an isogrid panel incorporating the thermal management system.

A section of a conventional isogrid structure is shown in FIG. 3a. This sample baseline panel consists of aluminum 6061 (25×15×0.3 cm) with solid ribs measuring 3-mm wide and 2.2-cm tall. The second panel (FIG. 3b) is modified to incorporate fluid channels in the lengthwise ribs. For these modified ribs, the total cross-sectional area was increased to accommodate the channels. However, the material area was kept the same. By keeping the mass of each rib the same, a sound structural analysis comparison can be made between the panels. FIG. 3c shows a sample pattern of capillary channels in the face sheet and their connection to the fluid channels in the lengthwise ribs. FIG. 4 is a more detailed cross-sectional view and an overhead view of the panel. The ribs are the main fluid carriers. They are connected to the capillary channels just under the surface of the face sheet with a thermal valve controlling the flow into the capillary system.

The ultimate goal for a true symbiotic structure is to increase functionality without degrading other key characteristics of the system. As mentioned previously for aerospace structures, this key driving characteristic is the stiffness-to-weight ratio of the system. The added functionality for this symbiotic system is afforded by the inclusion of the fluidic channels in the structure. Numerous examples in the previous art have either added a strap-on system to the structural panels or have embedded components in a solid chunk of material. Both of these approaches result in a very heavy, inefficient structure. In this embodiment, the novel properties of isogrid structures are leveraged to advantage. The ribs are widened to accommodate the channel; however, the total material cross-sectional area remains the same between the traditional implementation and this modified embodiment. By keeping the total material cross-sectional area the same, the mass for each panel remains the same as does its axial tension and compression strength. In addition, the increased total cross-sectional area for this embodiment increases the bending moment of the rib and improves the performance of the panel in bending and torsion. Therefore, a true symbiotic panel is achieved by improving the structural performance of the panel and adding the functionality of the fluid channels.

The system further improves the functionality of the system by integrating fluid channels in the actual face-sheet of the panel. These capillary-like channels provided localized fluid flow that can be used for a number of applications, but most notably thermal control. The fluid channels can be implemented in a number of ways including multi-pass serpentine paths, single straight vertical paths, multiple straight vertical paths or many others (FIG. 2).

To optimize the thermal efficiency of the system, the fluid flow to the distribution system must be controlled. Controlling the system is critical for a robust solution for satellite thermal control. The challenge with satellite thermal control is the wide range of environments and component heat loads that must be accommodated. Traditionally, the thermal control system is sized for the maximum heating condition. Unfortunately, the satellite only operates at this condition for a fraction of its lifetime. To ensure that components do not get too cold, supplemental survival heat must be supplied at a significant cost of mass and power. By modulating the flow to the component, one significantly reduces the requirement for survival heater power while still meeting the demands of the system.

Figure 5:
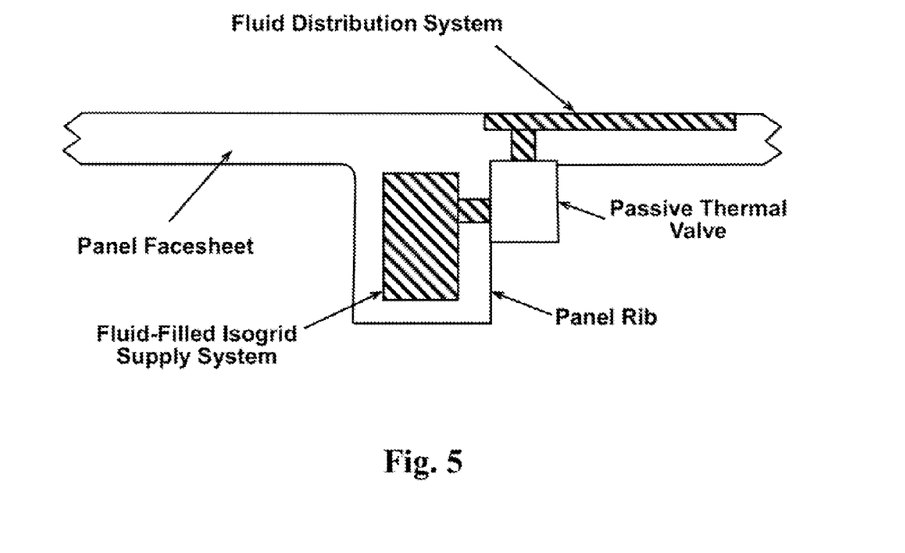
FIG. 5 is a cross-section depicting a passive flow control system.

There are several methods for controlling the flow to components. One embodiment employs localized passive control methods. Passive methods offer the advantages of inherent reliability, reduced complexity, and no requirement for additional power or support equipment. To that end a passive-reactive micro valve was designed, which uses the phase change of paraffin to actuate the valve and control flow to the face-sheet. Paraffin is ideal for this application because it expands up to 15% when it melts creating a hydraulic force that can be used to open or close a valve. In addition, the melting temperature can be tailored between 178° K and 358° K in increments of approximately 10° K by changing the number of carbon atoms in the paraffin chain. Thus, the activation properties of the valve can be designed to meet the needs of the system or of individual components. FIG. 5 shows a schematic of the passive flow control and the location of the micro valve in the system. The panel rib is filled with fluid and is connected to the panel face sheet channels via the passive thermal valve. In addition, the passive thermal valve must be thermally coupled to the component or area to be cooled to ensure proper operation. Alternatively, an active valve of multiple embodiments can be utilized in place of or in addition to the passive thermal valve.

Figure 6:
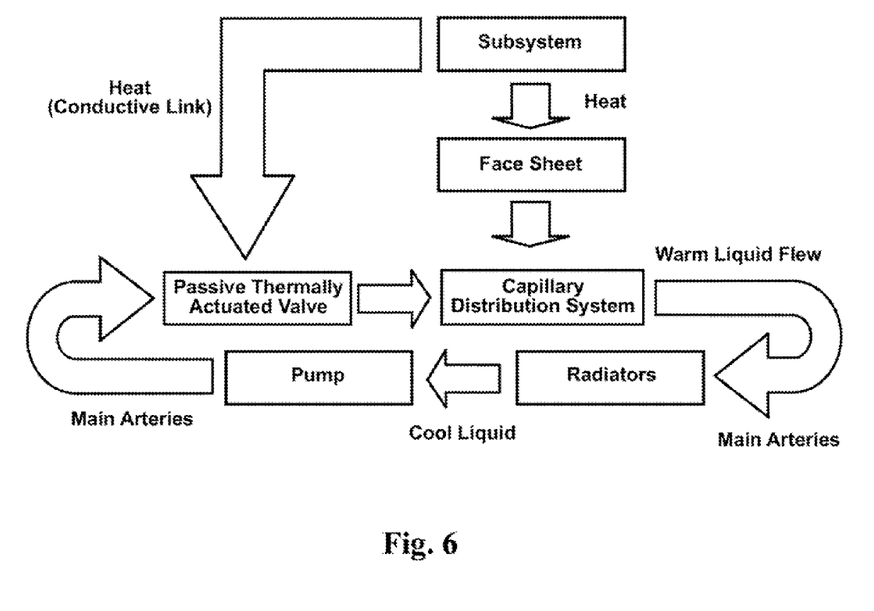
FIG. 6 is a general thermal schematic for the symbiotic isogrid structure.

FIG. 6 shows a general schematic of the thermal subsystem. The system is designed such that the thermal control system can be varied to meet the needs of the components. The modified isogrid panel is used to absorb excess heat generated by a satellite subsystem. The heat is transferred to the face sheet and hence to the embedded capillary distribution system. The hollow ribs provide the primary fluid flow to the system, and the capillary distribution system provides the heat removal capability. To control the temperature of the subsystem, a passive, thermally-coupled valve controls the flow. When the component is too hot, the thermal valve opens allowing coolant to pass from the arteries to the capillaries to cool the subsystem. The valves are thermally activated by the phase change expansion of paraffin and are thermally coupled through a copper braid connection. The coolant flows out of the capillaries back into the main artery system where it flows into a radiator for cooling. The fluid is then pumped back into the arterial system. When the subsystems are cool, the valve closes allowing the component to retain heat thus limiting the heater power requirement for the system. The system can be optimized to a number of different parameters including but not limited to subsystem power levels, temperature requirements, pressure loss, flow velocity, and channel length. A number of different design variables can be utilized in addition to the aforementioned including channel geometry, valve response, face-sheet channel geometry, and face-sheet panel length or pattern, in addition to others as is well known in the art.

Figure 7:
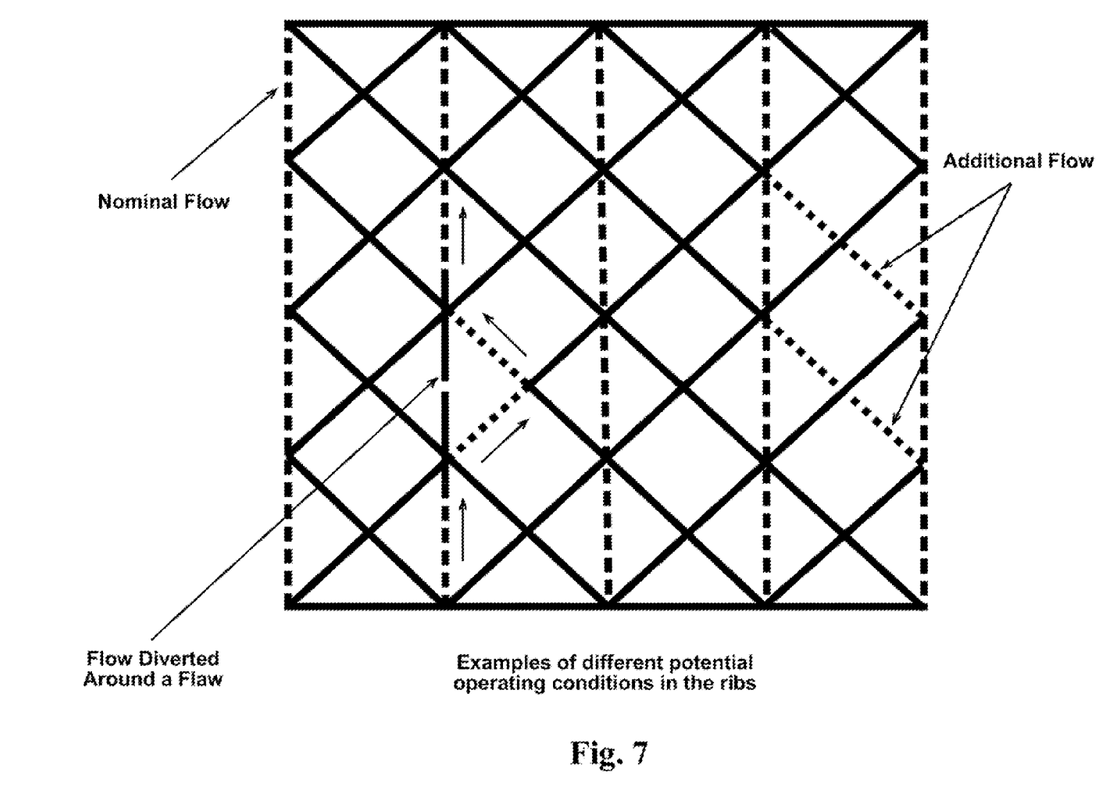
FIG. 7 is an example of different potential operating conditions in the ribs of the isogrid panel.

In addition to the above, the panel can further be enhanced through a damage tolerant, reconfigurable system. In the nominal configuration only the lengthwise (longitudinal) ribs are used for the bulk transport of fluid; however, the transverse ribs can also be used to reconfigure or enhance fluid flow. A system of shut-off valves can be incorporated into the rib structure of the panel at each point where the longitudinal and transverse ribs intersect (nodes). These shut-off valves provide the means to reconfigure the primary fluid flow paths within the panel. This would require a means to detect flaws in the fluid flow through the primary fluid flow pathway and control means to activate the proper shut-off valves. Fluid flow can thereby be shut off from or diverted around damaged, leaking, or clogged sections. In addition, fluid flow can be enhanced by using both the lengthwise and transverse ribs simultaneously. FIG. 7 depicts a number of different possible operating conditions. Fluid valves can also be incorporated into the face-sheet fluid paths to further enhance the system's ability to be reconfigured.

The invention claimed is:

1. A modified isogrid panel comprising of longitudinal and transverse reinforcing ribs that intersect each other, said ribs being attached to an inner surface of a face sheet and said face sheet having an outer surface, the isogrid panel modified for the purpose of thermal control and further comprising:
   a. hollow longitudinal ribs providing a primary fluid flow pathway, said hollow longitudinal ribs having essentially the same mass as the longitudinal solid ribs of an unmodified isogrid panel;
   b. one or more fluid distribution channels embedded in said face sheet immediately under the outer surface of said face sheet, each of said one or more fluid distribution channels a fluid input point and a fluid outflow point;
   c. a passive thermally-coupled flow control valve located in a passageway connecting said primary fluid flow pathway to each of said fluid input points;
   d. a return passageway between each of said fluid outflow points and said primary fluid flow pathway, whereby excess heat absorbed by said face sheet fluid from a heat-producing subsystem can be directed through a radiator system to cool said fluid and on to a pump to circulate said fluid through said modified isogrid panel.

2. The modified isogrid panel of claim 1, wherein hollow transverse ribs are also employed to thereby enhance the primary fluid flow pathway.

3. The modified isogrid panel of claim 2, wherein shutoff valves are incorporated at each longitudinal and transverse rib intersection.

4. The modified isogrid panel of claim 3, further including means for controlling said shutoff valves whereby said primary fluid flow may be diverted to bypass any detected flaws in said primary fluid flow pathway.

\* \* \* \* \*